Nov. 3, 1970 J. RABINOW 3,538,338

OPTICAL CODE APPARATUS FOR SORTING APPLICATIONS UTILIZING UNIQUE CIRCUITOUS LIGHT PATH AND SETABLE VANES

Filed June 4, 1968 2 Sheets-Sheet 1

INVENTOR
Jacob Rabinow

BY Joseph A. Genovese
ATTORNEY

Nov. 3, 1970 J. RABINOW 3,538,338

OPTICAL CODE APPARATUS FOR SORTING APPLICATIONS UTILIZING UNIQUE CIRCUITOUS LIGHT PATH AND SETABLE VANES

Filed June 4, 1968 2 Sheets-Sheet 2

INVENTOR
Jacob Rabinow

BY Joseph A. Genovese

ATTORNEY

United States Patent Office 3,538,338
Patented Nov. 3, 1970

3,538,338

OPTICAL CODE APPARATUS FOR SORTING APPLICATIONS UTILIZING UNIQUE CIRCUITOUS LIGHT PATH AND SETABLE VANES

Jacob Rabinow, Bethesda, Md., assignor to Control Data Corporation, Rockville, Md.

Filed June 4, 1968, Ser. No. 734,447
Int. Cl. B07c *5/342;* G01n *21/30;* G06m *7/00*
U.S. Cl. 250—219 7 Claims

ABSTRACT OF THE DISCLOSURE

A sorting conveyor code system having an optical code device for each sort destination. The optical code is established by prisms in a light path between a lamp and a photocell, which deflect the light beam so that portions occupy positions along the lamp-photocell optical axis and other portions occupy positions parallel to and laterally offset from the optical axis. The respective positions correspond to binary 1 and 0 of a binary number. The places of the binary number are established by the spaces between prism positions which the light beam portions span.

Movable code devices made of light blocking vanes adjustable to one of two binary positions, interrogate the optical codes as they escort the articles to be sorted. An escort code matches an optical code when its light beam is not interrupted by any of the vanes, i.e. when the binary positions of the vanes are identical to the binary positions of the portions of the light beam thereby allowing the beam to inpinge on the photocell.

SPECIFICATION

This invention relates to sorting and particularly to sorting machines which rely upon escort codes to sort articles to preselected sort destinations.

There are several basic types of code devices used for sorting. For example, there are mechanical devices, electro-mechanical devices, photoelectric optical and magnetic code devices. Each type has certain advantages and disadvantages which are known in the art. My invention combines features of photoelectric optical and mechanical coding in a way to obtain high reliability at comparatively low initial and operating cost.

In my invention I have stationary code devices which rely upon optical means to form codes which are interrogated for coincidence by movable escort code devices. More specifically, a lamp and a photocell are spaced along an optical axis at or near each conveyor destination. The optical destination code is formed by causing the light beam to be deflected in a circuitous path by mirrors or prisms in a manner such that portions of the beam are displaced to occupy positions parallel to and slightly spaced from the beam axis to represent a binary value, said 0, and other portions of the beam are on the optical axis to represent binary 1. The spaces between prism positions form information channels corresponding to the digit places of a binary code. Thus, the optical code can be expressed as a binary number having a number of places (digits) equal to the number of information channels whose number is equal to one less than the number of prism positions between the lamp and photocell. To form trinary codes the beam deflections are on either or both sides of and on the optical axis instead of on the axis and on one side only to establish a binary code.

My escort code devices each consist of a column of light-blocking vanes which are adjustable to one of two binary positions. In the binary one position they allow the interrogated portion of the light beam in its binary one position to pass, and will block the interrogated beam portion if it is in its binary zero position. When a vane is adjusted to its zero position it will block an interrogated portion of the beam in its binary one position and will allow the beam portion to pass if it is in its binary zero position. The escort code device is proportioned such that each vane passes through one information channel, whereby each vane interrogates one digit place of the optical code, i.e. it blocks or passes the beam portion spanning the information channel which it interrogates.

Accordingly as the escort code devices move with their articles to be sorted through each destination station the photocell of any destination code device which experiences light from its lamp yields a coincidence signal.

An object of my invention is to provide a sorting system relying upon stationary destination code devices and movable escort code devices constructed and arranged substantially as described above.

Another object of my invention is to provide an optical code device which is coded by the positions of portions of a light beam across a group of information channels which designate the place or digit value position of the code.

A further object of the invention is to provide an optical code device using a single light source and a single photocell to form binary codes of a number of places selected from a wide range whose upper limit is fixed by attenuation of the light beam.

Another object of the invention is to provide a mechanical code device for interrogating the above optical code device and enabling the optical code device to yield a signal upon coincidence of the optical and the mechanically formed codes.

Other objects and features will become apparent in the description of the drawings wherein.

BACKGROUND

Figure 1:
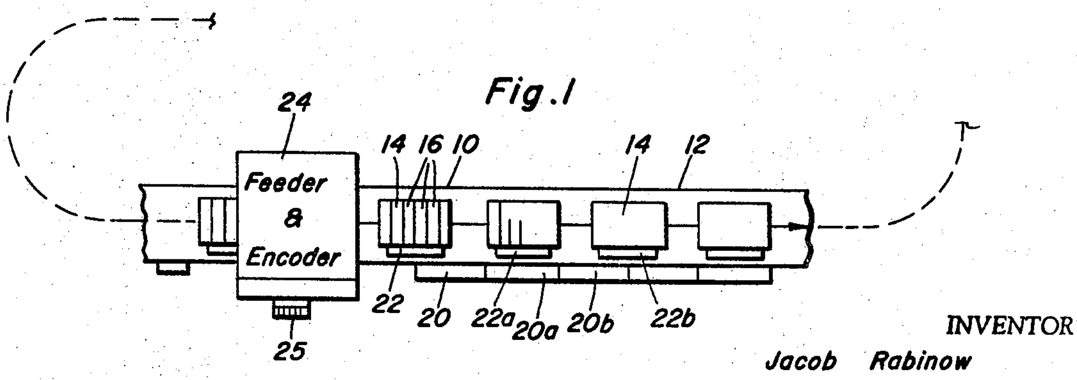
FIG. 1 is a schematic view of a sorting conveyor in accordance with the invention.

FIG. 1 shows a sorting conveyor 10 using escort codes to sort articles to preselected destinations. Although conveyor 10 can sort almost any kind of article, let us assume for the purpose of brevity only, that the conveyor is used to sort postal letters or packages. In that environment the conveyor has a frame 12 including a track on which a train of wheel-supported carts 14 is moved by electric motors and drive mechanisms (not shown). Each cart has vertical compartments or pockets 16 with a hinged door 18 (FIG. 3) at their bottoms to support postal articles and drop them into predetermined destination or sort bins (FIG. 2) as explained below.

A stationary code device 20, 20*a* . . . 20*n* is located at each sort or destination station. An escort code device 22, 22*a* . . . 22*n* for each pocket 16 is attached to a side of each cart. Both the optical and the escort code devices are adjustable in a manner to select binary (shown) or trinary (not shown) codes. The stationary destination code devices are adjusted originally and they are not again adjusted under ordinary operating conditions. The escort code devices are adjusted upon receipt of articles in their associated pockets similar, for example, to the corresponding function described in Pat. No. 2,901,089.

As in that patent articles are fed by feeder-encoder 24 (FIG. 1) into successive pockets of the carts after the destination (postal address) of each article is determined. The encoder 24 operating synchronously with the feeding of articles into the cart pockets, encodes the escort code devices with a code corresponding to the read address. The reading can be accomplished by human beings and the encoding accomplished via keyboard 25, or the addresses can be read by an optical reading machine, e.g. as in Pat. No. 3,104,369, and the encoding accomplished electromechanically by signals from the reading machine (not shown). In either case, the escort code devices interrogate for coincidence the successive destination code devices 20. Upon coincidence, e.g. an escort code set for Detroit matches a destination code device also set for Detroit, a signal (origin described later) is conducted on line 28 (FIG. 5) to operate an interposer represented as solenoid 30 which operates escapement 32 to release or unlatch the door 18 (FIG. 3) and allow the letter in its pocket to drop into the "Detroit" sort bin, e.g. Sort Bin No. 1 of FIG. 2. The escapement 32 and letter droping operation is similar to Pat. No. 2,901,089.

OPTICAL CODE DEVICE

All of the stationary, optical code devices 20, 20*a*, 20*b* . . . 20*n* are the same, and one device is used for each sort destination station. The construction of each optical code device is such that only a single photocell is required to form codes with any number of places limited only by light attenuation. For example, two-digit to at least twenty-digit binary numbers can be expressed by the use of a single inexpensive photocell, a low voltage lamp, and a set of mirrors or prisms, the number of which will vary in accordance with the number of digit-changes or reversals in the code. This is suggestive of the reversals in a non-return-to-zero magnetic recording.

Figure 2:
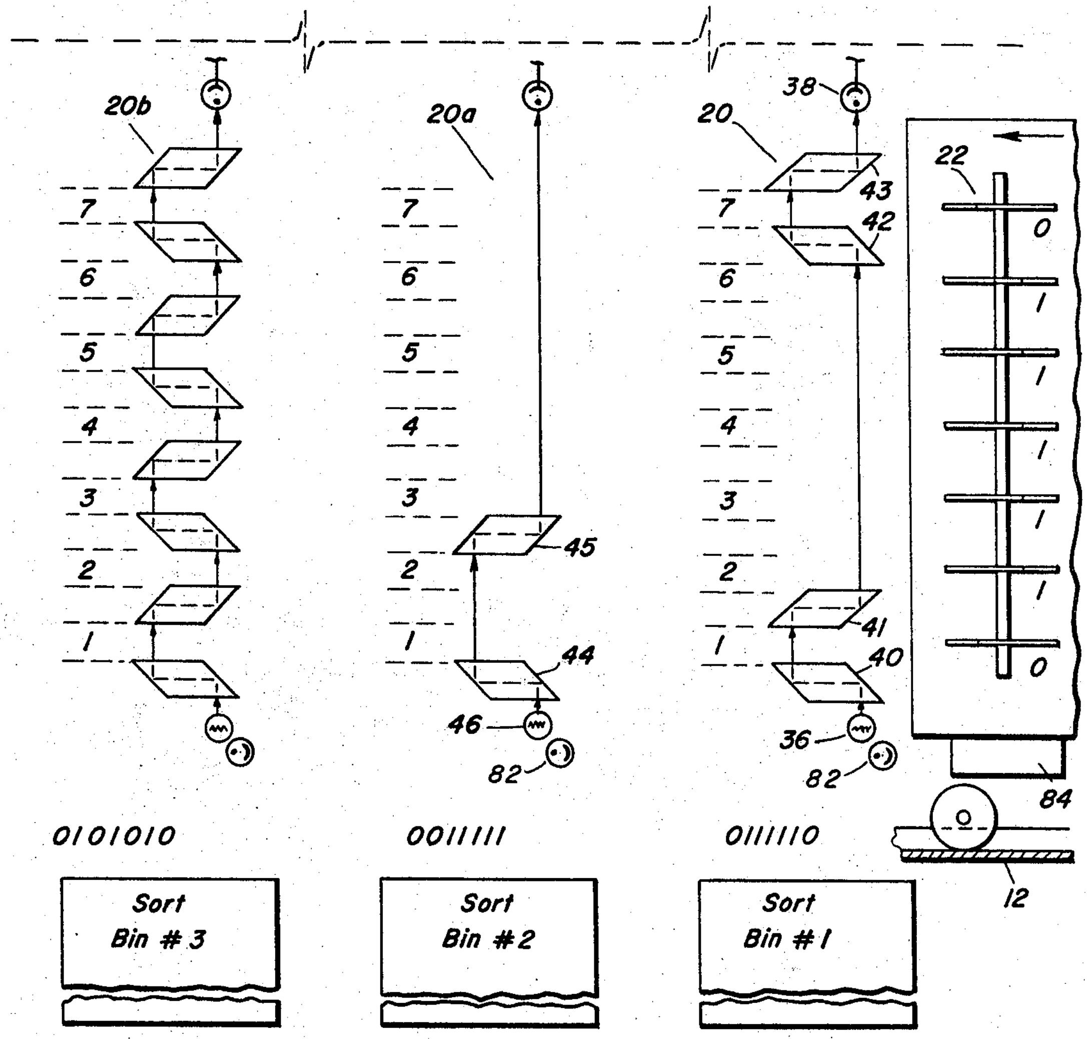
FIG. 2 is partially elevational and partially schematic view of an escort code device and a stationary code device in FIG. 1.

Consider the code device 20 in FIG. 2 which is arranged to represent the binary code 0111110. Lamp 36 provides a light beam directed along a vertical optical axis toward photocell 38. The lamp and photocell are mounted on the frame 12 of the sorting machine. There are eight prism locations (the number can be increased or decreased) along the optical axis defining seven horizontal information channels designated 1–7 inclusive, meaning that a seven place binary number can be defined. Prisms 40, 41, 42 and 43 are mounted adjacent to channels 1, 2, 6 and 7 to define the above binary number as explained below.

The value of the binary digits (1 or 0) is established by the positions of portions of the light beam spanning the several information channels. If the portion of the light beam coincides with the optical axis the digit represented thereby is binary 1 (arbitrarily). If the portion of the beam is laterally spaced from the axis, the digit represented is binary 0. The prisms such as at 40, 41, 42 and 43 in optical code device 20 are used to deflect portions of the light beam to binary 0 position in information channels 1 and 7, and portions of the beam to the binary 1 position in channels 2–6. More particularly, the light beam from lamp 36 is deflected to the left and upward by prism 40 so that the beam portion spannel channel 1 defines binary 0 in the first place of the code for which device 20 is adjusted. Prism 41 deflects the beam back to coincide with the optical axis where it remains to cross channels 2–6 inclusive thereby defining binary 1's in each of these channels. Prism 42 laterally deflects a portion of the beam to the binary 0 position across channel 7, and prism 43 returns the beam to the optical axis so that it falls upon photocell 38.

Optical code device 20*a* has prisms 44 and 45 located beneath channels 1 and 3 to form the binary code 0011111. Prism 44 deflects a portion of the light beam from lamp 46 to the binary 0 position across channel 1 where it remains to cross channel 2 after which prism 45 returns a portion of the beam to the binary 1 position across the remaining channels 3–7 inclusive. Device 20*b* requires the maximum of eight prisms to define the seven place binary number 0101010. The maximum number of prisms are required because there is a bit value change at each place in the binary number.

Figure 3:
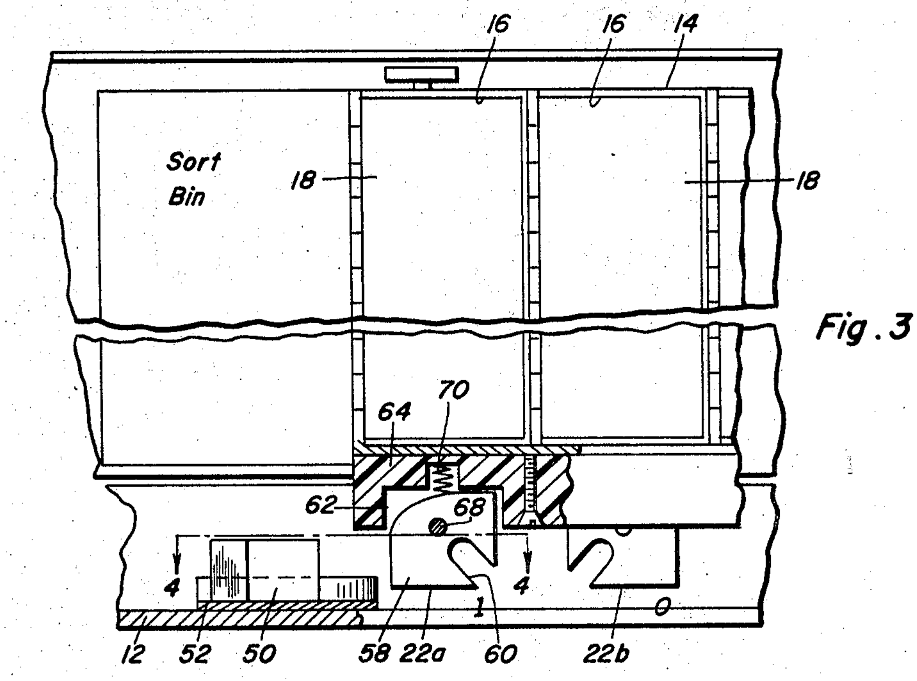
FIG. 3 is a top view showing an escort code device on a sorting machine cart about to interrogate an optical code device; parts of this view are shown in section.
Figure 4:
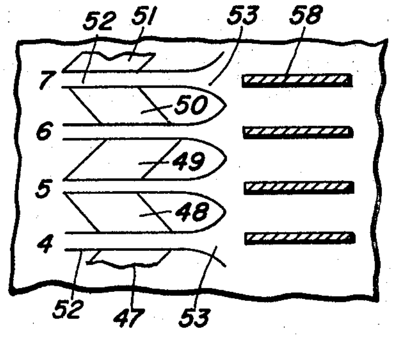
FIG. 4 is a view taken on the line 4—4 of FIG. 3.

FIGS. 3 and 4 show fragments of the structure of my optical code device more nearly to scale. Prisms 47–51 (FIG. 4) are adjacent to information channels 4–7, each of which is provided with a channel shaped guard 52 which acts as a light shield and as a mechanical protector for the adjacent prisms. Guards 52 have flared entrances 53 and they are attached to a part of the machine frame 12 in the information channels 1–9.

ESCORT CODE DEVICE

As noted before, there is an escort code device for each pocket 16. Two devices 22*a* and 22*b* are shown in FIG. 3. Each device, e.g. device 22*a* is made of a group of light blocking vanes 58 with a light-passing aperture 60 at one corner. The vanes are located in slots 62 within mounting block 64 which is detachably secured to the side of a conveyor cart. Conventional means, e.g. screws or snap fasteners or clamps are used to fasten block 64 to the cart so that the entire escort code device can be readily removed and replaced for servicing the same.

A pivot pin 68 pivotally supports vanes 58 in their slots 62, and detents 70 retain the vanes in either of two pivoted positions to represent binary 1 and binary 0 respectively. When, for example, the vane is in the position shown at 22*a* in FIG. 3, i.e. with aperture 60 at the right corner locations as viewed from above, a binary 1 is represented. When the vane is adjusted to its other position as shown at 22*b* in FIG. 3, binary 0 is represented with the aperture in the left corner as viewed from above.

As is clearly shown in FIG. 2, each escort code device has one vane horizontally aligned with each information channel 1–7 of every optical code device. Accordingly, as carts 14 are moved through a sort station the escort code device vanes pass through each information channel and interrogate the optical code for coincidence with the code established by the settings of the vanes 58. When the two codes are identical the light beam from the lamp of the optical code device passes through the apertures 60 in each of the vanes of the escort code device and impinges upon the photocell which is optically aligned with the lamp.

CONTROL CIRCUITS

Figure 5:
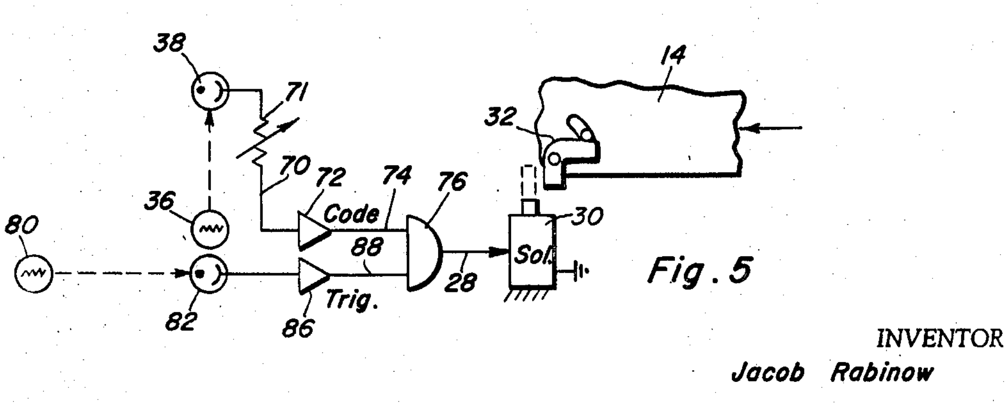
FIG. 5 is a fragmentary view showing a trip mechanism to release an article from a cart to sort the article, and also showing a logic circuit to actuate the trip mechanism.

The optical code photocell 38 is shown in FIG. 5. Upon code coincidence as described above, light from lamp 36 impinges on this photocell and provides an output on line 70 which is amplified by quantizing amplifier 72 and conducted on line 74. This line forms an input to a two-entry AND gate 76 whose output signal on line 28 actuates an interposer to release the contents of the associated pocket 16. An automatic gain control (AGC) circuit or a manual potentiometer 71 as shown, is used to adjust photocell gain for variations in light, e.g. the number of reflections differ (see FIG. 2) for any reason.

Gate 76 prevents a photocell signal from reaching the interposer 30 at all times except when an escort code device is in the process of interrogating one of the optical codes, as explained below. A lamp 80 and photocell 82 provides an optical path across the track of the conveyor (a potential source and switch circuit will also serve the purpose). A flag 84 (FIG. 2) is attached to the cart beneath each escort code device or is otherwise so positioned that the last-mentioned optical path is blocked during the time that the escort code vanes pass through information channels 1–7 of an optical code device. The amplifier 86 for photocell 82 (FIG. 5) is designed to provide a signal on line 88 when the photocell 82 is blanked. As shown, line 88 is connected as an input to gate 76 thereby enabling gate 76 to pass a signal on line 74, if any, during the time that photocell 82 is blanked by flag 84.

It is understood that numerous changes may be made without departing from the protection of the following claims.

What is claimed is:

1. In a sorting conveyor, the improvement comprising stationary code devices and movable escort code devices operative therewith, one of said destination code devices comprising a light source, a photocell spaced therefrom, a plurality of light deflecting element positions located between said source and said photocell, light deflecting elements occupying at least some of said positions to deflect the beam of light in a unique circuitous path such that the positions of portions of the beam represent binary digits of a binary code, said escort code device having means for interrogating the last-mentioned code for coincidence and thereby enable said photocell to provide a code match signal, said interrogating means including a plurality of spaced vanes adjustable to selected binary positions which represent digits of the escort binary code, said vanes adapted to pass through the spaces between said light deflecting element positions for interrogating said destination code, and means between said elements forming a light shield for said vanes and elements and also forming mechanical guards for said elements.

2. In a sorting conveyor, the improvement comprising stationary destination code devices and movable escort devices operative therewith, one of said destination code devices comprising a light source providing a beam of light, a photocell spaced therefrom, a plurality of light deflecting element positions located between said source and said photocell, light deflecting elements occupying at least some of said positions to deflect the beam of light in a unique circuitous path such that the positions of portions of the beam represent digits of a binary code, said light source and said photocell defining an optical axis, said light deflecting element positions being spaced along said axis with the spaces between elements defining information channels, said elements at the positions which they occupy deflecting a portion of the light beam to a position spaced from said axis and crossing one of said information channels to define a binary value different from the binary value represented by a portion of the beam which crosses an information channel along said optical axis, said information channels thereby representing the places in a binary code so that a single light source and photocell provide an optical code of a word length corresponding to the number of information channels along said optical axis, said escort code device having means for interrogating optical code for coincidence to thereby enable said photocell to provide a code match signal, said interrogating means including a plurality of vanes which are adjustable to selected binary positions in which portions of the light beam are respectively passed or blocked, and said vanes being so spaced that a vane passes through an information channel to interrogate the optical code.

3. The subject matter of claim 2 and mechanical means at each information channel cooperating with the edge of each vane to form a labyrinth light trap between adjacent light deflecting element positions.

4. The subject matter of claim 3 wherein said mechanical means include structures having entrances to lead said vanes through said channels.

5. In a sorting machine, the improvement comprising stationary optical code devices and movable code devices operative therewith, one of said optical code devices comprising a photocell and a source of light spaced therefrom, said light source producing a light beam which establishes an opitcal path between said source and said photocell, means for forming an optical code including a plurality of light deflecting elements along said path which laterally deflect portions of said beam to a lateral position relative to said path and thereby define binary digits, said light deflecting elements being spaced from each other with the spaces between elements constituting information channels across which said laterally deflected portions of said beam extend in defining said binary digits, said movable code devices adapted to interrogate said optical code for coincidence and including a plurality of vanes arranged to form a code and spaced from each other distances such that the vanes pass through said information channels and enable said photocell to provide a match signal when the code of said vanes matches said optical code.

6. The subject matter of claim 5 wherein portions of said beam crossing said channels but which are not deflected by said elements define binary digits of a value different from said first-mentioned binary digits, and said vanes being adapted to be arranged in one of two positions to establish the code of the vanes with the vanes cooperating with the laterally deflected and the nondeflected portions of said beam being interrogated by the vanes in said two positions thereof.

7. The subject matter of claim 6 and means connected with said photocell for controlling the gain of the output thereof.

References Cited

UNITED STATES PATENTS

| | | | |
|---|---|---|---|
| 2,237,132 | 4/1941 | Christensen | 250—223 X |
| 2,448,830 | 9/1948 | Robbins et al. | 250—223 X |
| 3,086,121 | 10/1959 | Cockrell | 250—219 |
| 3,394,262 | 7/1968 | Kintigh | 250—219 |

OTHER REFERENCES

Brandenberg, Pluggable Fiber Optics Data Searching Apparatus, IBM Technical Disclosure Bulletin, vol. 5, No. 1, June 1962, p. 89.

WALTER STOLWEIN, Primary Examiner

T. N. GRIGBY, Assistant Examiner

U.S. Cl. X.R.

209—111.7; 250—223; 340—149